United States Patent
Hooker et al.

(10) Patent No.: US 9,251,083 B2
(45) Date of Patent: Feb. 2, 2016

(54) COMMUNICATING PREFETCHERS IN A MICROPROCESSOR

(71) Applicant: VIA TECHNOLOGIES, INC., New Taipei (TW)

(72) Inventors: Rodney E. Hooker, Austin, TX (US); John Michael Greer, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 487 days.

(21) Appl. No.: 13/792,428

(22) Filed: Mar. 11, 2013

(65) Prior Publication Data

US 2014/0258641 A1    Sep. 11, 2014

(51) Int. Cl.
G06F 12/00 (2006.01)
G06F 12/08 (2006.01)

(52) U.S. Cl.
CPC .... *G06F 12/0862* (2013.01); *G06F 2212/6026* (2013.01)

(58) Field of Classification Search
USPC ......................................................... 711/137
See application file for complete search history.

(56) References Cited

U.S. PATENT DOCUMENTS

| | | | |
|---|---|---|---|
| 5,003,471 A | 3/1991 | Gibson | |
| 5,023,776 A | 6/1991 | Gregor | |
| 2003/0191901 A1 | 10/2003 | Hill et al. | |
| 2005/0223175 A1 | 10/2005 | Hepner et al. | |
| 2007/0043908 A1 | 2/2007 | Diefendorff | |
| 2007/0101066 A1 | 5/2007 | Sukhni et al. | |
| 2008/0243268 A1 | 10/2008 | Kandaswamy et al. | |
| 2009/0006762 A1 | 1/2009 | Gara et al. | |
| 2009/0138661 A1 | 5/2009 | Lauterbach | |
| 2009/0198909 A1 | 8/2009 | Speight et al. | |
| 2010/0030973 A1 | 2/2010 | Speight et al. | |

(Continued)

FOREIGN PATENT DOCUMENTS

| | | |
|---|---|---|
| CN | 1818855 A | 8/2006 |
| TW | 201035867 | 10/2010 |

OTHER PUBLICATIONS

Edmund Preiss. "Intel® Core™ Microarchitecture." EMEA Software Solutions Group. Downloaded from http://www.polyhedron.com/web_images/documents/MicroArchitecture.pdf on Dec. 22, 2009. pp. 1-32.

*Primary Examiner* — Reginald Bragdon
*Assistant Examiner* — Hannah A Faye-Joyner
(74) *Attorney, Agent, or Firm* — E. Alan Davis; James W. Huffman

(57) ABSTRACT

A microprocessor includes a first and second hardware data prefetchers configured to prefetch data into the microprocessor according to first and second respective algorithms, which are different. The second prefetcher is configured to detect a memory access pattern within a memory region and responsively prefetch data from the memory region according the second algorithm. The second prefetcher is further configured to provide to the first prefetcher a descriptor of the memory region. The first prefetcher is configured to stop prefetching data from the memory region in response to receiving the descriptor of the memory region from the second prefetcher. The second prefetcher also provides to the first prefetcher a communication to resume prefetching data from the memory region, such as when the second prefetcher subsequently detects that a predetermined number of memory accesses to the memory region are not in the memory access pattern.

20 Claims, 2 Drawing Sheets

(56) References Cited

U.S. PATENT DOCUMENTS

| | | |
|---|---|---|
| 2010/0095070 A1 | 4/2010 | Okawara et al. |
| 2011/0072218 A1 | 3/2011 | Manne et al. |
| 2011/0161587 A1 | 6/2011 | Guthrie et al. |
| 2011/0238920 A1 | 9/2011 | Hooker et al. |
| 2011/0238922 A1 | 9/2011 | Hooker et al. |
| 2011/0238923 A1 | 9/2011 | Hooker et al. |
| 2011/0264860 A1 | 10/2011 | Hooker et al. |
| 2012/0066455 A1 | 3/2012 | Punyamurtula et al. |
| 2014/0289479 A1 | 9/2014 | Hooker et al. |
| 2014/0310479 A1 | 10/2014 | Hooker et al. |

COMMUNICATING PREFETCHERS IN A MICROPROCESSOR

BACKGROUND

In the event of a cache miss, the time required for a microprocessor to access system memory can be one or two orders of magnitude more than the time required to access the cache memory, prefetch buffers or other storage elements within the microprocessor itself. For this reason, to reduce their memory latency, microprocessors incorporate prefetching techniques that examine recent data access patterns and attempt to predict which data the program will access next.

The benefits of prefetching are well known. However, prefetching can have harmful effects as well. For example, each prefetch request that goes out on the processor bus to memory consumes bandwidth of the bus and memory, which may already be congested. Additionally, the prefetch request may delay another request for data that is more urgently needed. For another example, if the data is prefetched into a cache memory, the prefetched cache line will typically cause an eviction of another cache line from the cache. If it turns out the evicted cache line is needed again sooner and/or more often than the prefetched cache line is needed, then the prefetch was likely detrimental to performance rather than helpful. Therefore, what is needed is an improved data prefetching mechanism.

BRIEF SUMMARY

In one aspect the present invention provides a microprocessor. The microprocessor includes a first hardware data prefetcher configured to prefetch data into the microprocessor according to a first algorithm and a second hardware data prefetcher configured to prefetch data into the microprocessor according to a second algorithm. The first and second algorithms are different. The second prefetcher is configured to detect a memory access pattern within a memory region and responsively prefetch data from the memory region according the second algorithm. The second prefetcher is further configured to provide to the first prefetcher a descriptor of the memory region. The first prefetcher is configured to stop prefetching data from the memory region in response to receiving the descriptor of the memory region from the second prefetcher.

In another aspect, the present invention provides a method. The method includes a first hardware data prefetcher prefetching data into a microprocessor according to a first algorithm. The method also includes a second hardware prefetcher detecting a memory access pattern within a memory region and responsively prefetching data from the memory region according to a second algorithm. The first and second algorithms are different. The method also includes the second prefetcher providing a descriptor of the memory region to the first prefetcher. The method also includes the first prefetcher stopping prefetching data from the memory region in response to receiving the descriptor of the memory region from the second prefetcher.

In yet another aspect, the present invention provides a computer program product encoded in at least one non-transitory computer usable medium for use with a computing device, the computer program product comprising computer usable program code embodied in said medium, for specifying a microprocessor. The computer usable program code includes first program code for specifying a first hardware data prefetcher configured to prefetch data into the microprocessor according to a first algorithm. The computer usable program code also includes second program code for specifying a second hardware data prefetcher configured to prefetch data into the microprocessor according to a second algorithm. The first and second algorithms are different. The second prefetcher is configured to detect a memory access pattern within a memory region and responsively prefetch data from the memory region according the second algorithm. The second prefetcher is further configured to provide to the first prefetcher a descriptor of the memory region. The first prefetcher is configured to stop prefetching data from the memory region in response to receiving the descriptor of the memory region from the second prefetcher.

DETAILED DESCRIPTION OF THE EMBODIMENTS

Figure 1:
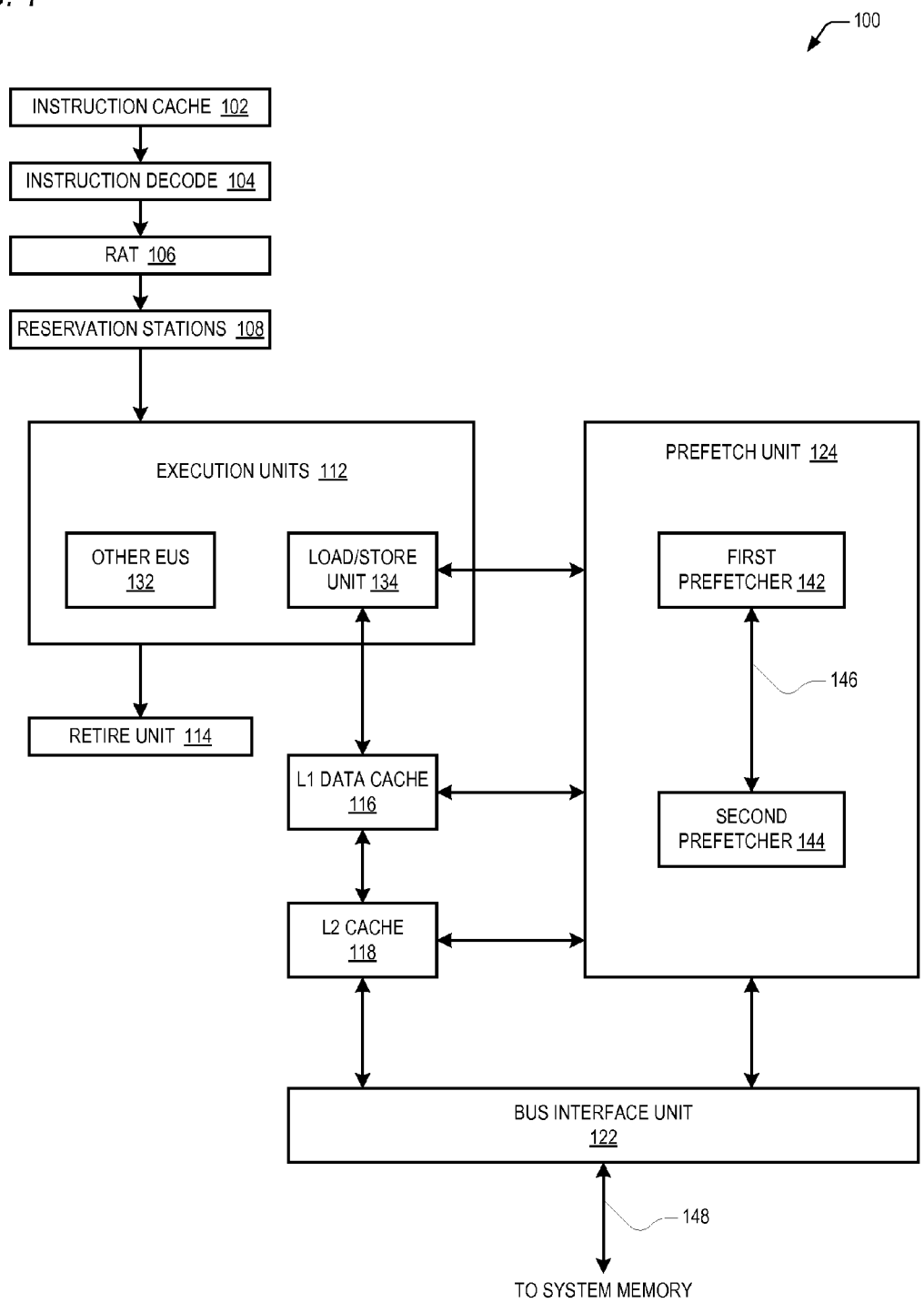
FIG. 1 is a block diagram illustrating a microprocessor.

Referring now to FIG. 1, a block diagram illustrating a microprocessor 100 is shown. The microprocessor 100 includes a pipeline of stages that includes various functional units. The pipeline includes an instruction cache 102, coupled to an instruction decoder 104, coupled to a register alias table (RAT) 106, coupled to reservation stations 108, coupled to execution units 112, coupled to a retire unit 114. The instruction decoder 104 may include an instruction translator that translates macroinstructions (e.g., of the x86 architecture) into microinstructions of the microinstruction set of a RISC-like microarchitecture of the microprocessor 100. The reservation stations 108 issue instructions to the execution units 112 for execution out of program order. The retire unit 114 includes a reorder buffer that enforces retirement of instructions in program order. The execution units 112 include a load/store unit 134 and other execution units 132, such as integer units, floating-point units, branch units, or SIMD units. The load/store unit 134 reads data from a level-1 (L1) data cache 116 and the store unit 134 writes data to the L1 data cache 116. A level-2 (L2) cache 118 backs the L1 data cache 116 and the instruction cache 102. The L2 cache 118 reads and writes system memory via a bus interface unit 122 that interfaces the microprocessor 100 to a bus 148, such as a local bus or memory bus, to which system memory (not shown) is coupled. The microprocessor 100 also includes a prefetch unit 124 that prefetches data from system memory into the L2 cache 118 and/or the L1 data cache 116 as described in detail herein.

The prefetch unit 124 includes a first prefetcher 142 and a second prefetcher 144. A data prefetcher, such as first prefetcher 142 and second prefetcher 144, is an apparatus that prefetches data into a microprocessor. To prefetch data into a microprocessor means to examine a stream of memory accesses made by a program being executed by the microprocessor, predicting one or more locations of data the program will access in the near future based on the examined stream, and fetching the data from the predicted one or more locations into the microprocessor (hopefully before the program requests the data). A stream of memory accesses is two or more requests to read or write data, wherein each of the two or more requests specifies a memory address that identifies the location of the data in memory. Advantageously, the first prefetcher 142 and the second prefetcher 144 communicate with one another via communication signals 146 in order to potentially improve the prefetch effectiveness of the prefetch unit 124 and accompanying overall performance of the system that includes the microprocessor 100 and system memory. In particular, the communication between the first prefetcher 142 and the second prefetcher 144 may result in more efficient use of the bandwidth of the processor bus 148 and/or system memory as well as the cache memories 116/118.

A data prefetcher, such as first prefetcher 142 and second prefetcher 144, prefetches according to an algorithm that it employs to predict the one or more locations from which to fetch the data. For example, a simple algorithm is a next sequential algorithm according to which the prefetcher examines the location of a memory access of the program stream and predicts the program will access data from the next sequential location. (Typically, an entire cache line is prefetched into a cache memory of the microprocessor. Hence, the prefetcher prefetches a cache line amount of memory locations that are next to the cache line worth of memory locations that includes the data specified by the program access.) The next sequential cache line may be in either an upward or downward direction in memory from the location of the program stream access. The prefetcher may look at two adjacent accesses in the stream to determine the upward or downward direction. For another example, according to a stride detection algorithm, the prefetcher may detect a stride pattern between temporally adjacent memory accesses of the stream and predict based on the stride. That is, the prefetcher looks for a gap distance between the temporally adjacent memory accesses and predicts that subsequent program accesses will be from locations that are the gap distance away from each other. For example, the prefetcher may see a stream that accesses locations 4, 8 and 12 and detects a gap distance of 4 and predicts the next access will be at 16. Prefetchers that employ more sophisticated stride algorithms may detect streams with different gap distances that appear in a pattern. For example, the prefetcher may see a stream that accesses locations 4, 8, 10, 14 and 16 and detect a first gap distance of 4 and a second gap distance of 2 and predict the next two accesses will be at 20 and 22. For yet another example, the prefetcher may employ an algorithm by which it detects a memory access pattern within a memory block that is relatively independent of the temporal order in which the accesses occur. Examples of such algorithms are employed in a "bounding box prefetcher" described substantially according to U.S. patent application Ser. No. 13/033,765, filed Feb. 24, 2011, which claims priority to U.S. Provisional Application No. 61/318,594 and which was published as U.S. Patent Publication No. 2011/0238922 on Sep. 29, 2011, each of which is hereby incorporated by reference herein in its entirety for all purposes. The first prefetcher 142 and second prefetcher 144 employ different prefetching algorithms.

Figure 2:
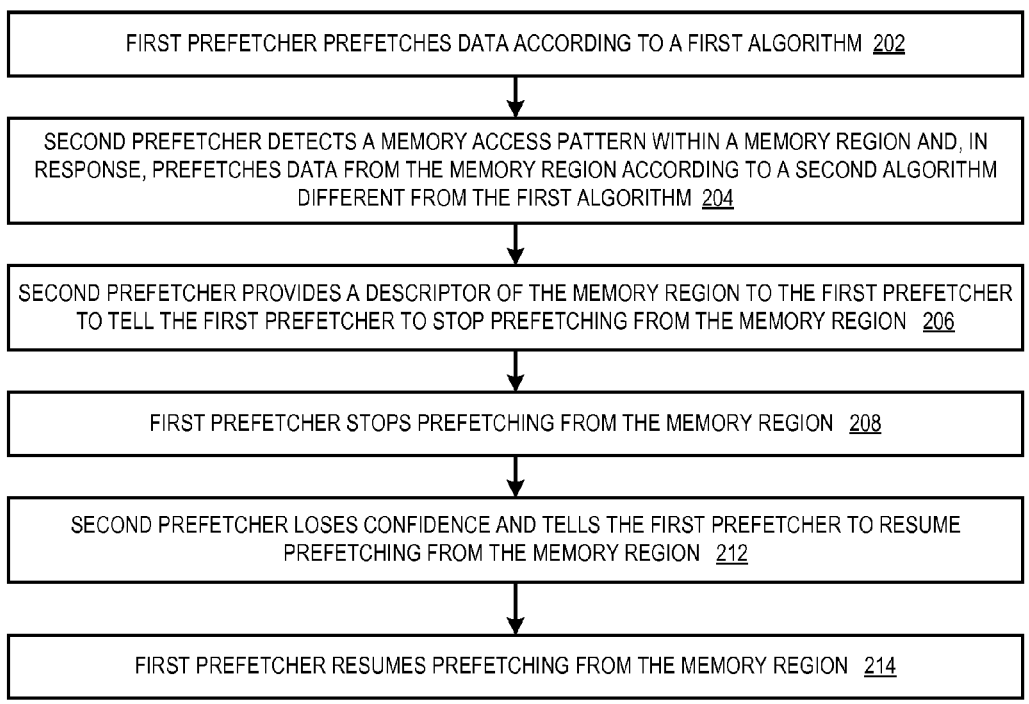
FIG. 2 is a flowchart illustrating operation of the microprocessor of FIG. 1, and more specifically the communicating first and second prefetchers.

Referring now to FIG. 2, a flowchart illustrating operation of the microprocessor 100 of FIG. 1, and more specifically the communicating first prefetcher 142 and second prefetcher 144, is shown. Flow begins at blocks 202 and 204.

At block 202, the first prefetcher 142 prefetches data according to a first algorithm. For example, the first prefetcher 142 examines a stream of memory accesses generated by the load/store unit 134, L1 data cache 116 and/or L2 cache 118 and prefetches data from system memory into the microprocessor 100 according to the first algorithm. Preferably, the first prefetcher 142 generates requests to the bus interface unit 122 to read data from system memory into the L1 data cache 116, L2 cache 118 or prefetch buffers (not shown). Flow proceeds to block 204.

At block 204, the second prefetcher 144 prefetches data, similar to the first prefetcher 142 at block 202; however, the second prefetcher 144 prefetches according to a second algorithm that is different from the first algorithm employed by the first prefetcher 142. Preferably, the second algorithm employed by the second prefetcher 144 is more complex and therefore capable of predicting more complex memory access patterns than the first algorithm employed by the first prefetcher 142. For example, the second prefetcher 144 may employ a prefetching algorithm similar to that described in U.S. patent application Ser. No. 13/033,765 referred to above. The second prefetcher 144 detects a memory access pattern within a memory region. In response, the second prefetcher 144 prefetches data from the memory region according to the second algorithm. In one embodiment, the memory region is a memory page as defined by the virtual memory capability of the microprocessor. Memory pages are described by their size and the fact that they are aligned to their size. For example, embodiments are contemplated in which the size of a memory page is 4 KB and is aligned on a 4 KB address boundary, although other page sizes may be employed. Furthermore, the second algorithm may employ memory regions other than memory pages. It should be understood that although blocks 202 and 204 appear in sequential order in FIG. 2, the first prefetcher 142 and the second prefetcher 144 are preferably operating concurrently to prefetch data from system memory according to their respective first and second algorithms. It should also be understood that the stream of memory accesses examined by the second prefetcher 144 might be different from the stream examined by the first prefetcher 142. Flow proceeds to block 206.

At 206, the second prefetcher 144 provides a descriptor of the memory region of block 204 to the first prefetcher 142. Sending the memory region descriptor serves as a notification to the first prefetcher 142 to stop prefetching from the memory region. Preferably, the memory descriptor comprises a memory address. In one embodiment, the memory region descriptor also includes a size of the memory region, whereas in other embodiments the size is predetermined, e.g., the size of the smallest memory page supported by the virtual memory system. The predetermined size may be programmable, e.g., by BIOS, the operating system or other software, e.g., via programmable registers of the microprocessor 100 (e.g., model specific registers), or by blowing fuses of the microprocessor 100 dedicated for such purpose. Flow proceeds to block 208.

At block 208, first prefetcher 142 receives the memory region descriptor provided by the second prefetcher 144 at block 206 and stops prefetching from the memory region. The first prefetcher 142 includes storage elements for storing the memory region descriptor and logic to determine whether a memory location from which the first algorithm predicts data should be prefetched is within the memory region. In one embodiment, the second prefetcher 144 is capable of employing the second prefetch algorithm for multiple memory regions concurrently and is capable of sending multiple memory region descriptors to the first prefetcher 142, which includes multiple storage elements for storing the multiple memory region descriptors and associated logic. Preferably, the first prefetcher 142 continues to monitor memory accesses even while it is stopped from prefetching in the memory region so that if the second prefetcher 144 tells it to start prefetching again from the memory region (as described below with respect to block 214) it can do so based on the most current memory access history. Flow proceeds to block 212.

At block 212, the second prefetcher 144 loses confidence in its ability to predict the memory access pattern the program is making in the memory region and, in response, tells the first prefetcher 142 to resume prefetching from the memory region. In one embodiment, the second prefetcher 144 loses confidence if, after having detected a memory access pattern in the memory region at block 204, the second prefetcher 144 detects that subsequent memory accesses of the stream in the memory region are not in the expected pattern. In one embodiment, a predetermined number of subsequent accesses in the memory region must not be in the pattern before the second prefetcher 144 loses confidence, and the predetermined number may be programmable similar to the fashion described above with respect to block 206. Preferably, the second prefetcher 144 also tells the first prefetcher 142 to resume prefetching from the memory region once the stream has left the memory region, e.g., once the stream has made a predetermined, preferably programmable, number of accesses that are not within the memory region. Flow proceeds to block 214.

At block 214, the first prefetcher 142 resumes prefetching from the memory region according to the first algorithm in response to receiving the communication from the second prefetcher 144 at block 212. Flow ends at block 214.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   a first hardware data prefetcher, configured to prefetch data into the microprocessor according to a first algorithm; and
   a second hardware data prefetcher, configured to prefetch data into the microprocessor according to a second algorithm, wherein the first and second algorithms are different;
   wherein the second prefetcher is configured to detect a memory access pattern within a memory region and responsively prefetch data from the memory region according the second algorithm;
   wherein the second prefetcher is further configured to provide to the first prefetcher a descriptor of the memory region;
   wherein the first prefetcher is configured to stop prefetching data from the memory region in response to receiving the descriptor of the memory region from the second prefetcher.

2. The microprocessor of claim 1, wherein the memory region is a memory page according to a virtual memory system of the microprocessor.

3. The microprocessor of claim 1, wherein the second prefetcher is further configured to provide to the first prefetcher a communication to resume prefetching data from the memory region according to the first algorithm.

4. The microprocessor of claim 3, wherein the second prefetcher is configured to provide the communication to the first prefetcher when the second prefetcher subsequently detects that a predetermined number of memory accesses to the memory region are not in the memory access pattern.

5. The microprocessor of claim 4, wherein the predetermined number of memory accesses to the memory region is programmable.

6. The microprocessor of claim 1, wherein the first and second data prefetchers prefetch data according to the first and second algorithms, respectively, in response to first and second respective streams of memory accesses.

7. The microprocessor of claim 6, wherein the first and second streams of memory accesses are the same stream of memory accesses.

8. The microprocessor of claim 6, wherein each of the memory accesses in the first and second streams specify a virtual memory address.

9. A method, comprising:
   prefetching, by a first hardware data prefetcher, data into a microprocessor according to a first algorithm;
   detecting, by a second hardware prefetcher, a memory access pattern within a memory region and responsively prefetching data from the memory region according to a second algorithm, wherein the first and second algorithms are different;
   providing, by the second prefetcher, a descriptor of the memory region to the first prefetcher; and
   stopping, by the first prefetcher, prefetching data from the memory region in response to receiving the descriptor of the memory region from the second prefetcher.

10. The method of claim 9, wherein the memory region is a memory page according to a virtual memory system of the microprocessor.

11. The method of claim 9, wherein the second prefetcher is further configured to provide to the first prefetcher a communication to resume prefetching data from the memory region according to the first algorithm.

12. The method of claim 11, wherein the second prefetcher is configured to provide the communication to the first prefetcher when the second prefetcher subsequently detects that a predetermined number of memory accesses to the memory region are not in the memory access pattern.

13. The method of claim 12, wherein the predetermined number of memory accesses to the memory region is programmable.

14. The method of claim 9, wherein the first and second data prefetchers prefetch data according to the first and second algorithms, respectively, in response to first and second respective streams of memory accesses.

15. A computer program product encoded in at least one non-transitory computer usable storage medium for use with a computing device, the computer program product comprising:

computer usable program code embodied in said storage medium, for describing a microprocessor, the computer usable program code comprising:

first program code for describing a first hardware data prefetcher, configured to prefetch data into the microprocessor according to a first algorithm; and second program code for describing a second hardware data prefetcher, configured to prefetch data into the microprocessor according to a second algorithm, wherein the first and second algorithms are different;

wherein the second prefetcher is configured to detect a memory access pattern within a memory region and responsively prefetch data from the memory region according the second algorithm;

wherein the second prefetcher is further configured to provide to the first prefetcher a descriptor of the memory region;

wherein the first prefetcher is configured to stop prefetching data from the memory region in response to receiving the descriptor of the memory region from the second prefetcher.

16. The computer program product of claim 15, wherein the memory region is a memory page according to a virtual memory system of the microprocessor.

17. The computer program product of claim 15, wherein the second prefetcher is further configured to provide to the first prefetcher a communication to resume prefetching data from the memory region according to the first algorithm.

18. The computer program product of claim 17, wherein the second prefetcher is configured to provide the communication to the first prefetcher when the second prefetcher subsequently detects that a predetermined number of memory accesses to the memory region are not in the memory access pattern.

19. The computer program product of claim 18, wherein the predetermined number of memory accesses to the memory region is programmable.

20. The computer program product of claim 15, wherein the at least one non-transitory computer usable storage medium is selected from the set of a disk, tape, or other magnetic, optical, or electronic storage medium.

* * * * *